US008045486B2

(12) United States Patent
Swan

(10) Patent No.: US 8,045,486 B2
(45) Date of Patent: Oct. 25, 2011

(54) DISCOVERY AND VISUALIZATION OF ACTIVE DIRECTORY DOMAIN CONTROLLERS IN TOPOLOGICAL NETWORK MAPS

(75) Inventor: Michael Jon Swan, Lafayette, CA (US)

(73) Assignee: Solarwinds Worldwide, LLC, Austin, TX (US)

( * ) Notice: Subject to any disclaimer, the term of this patent is extended or adjusted under 35 U.S.C. 154(b) by 273 days.

(21) Appl. No.: 12/153,273

(22) Filed: May 15, 2008

(65) Prior Publication Data

US 2009/0285120 A1   Nov. 19, 2009

(51) Int. Cl.
*H04L 12/28* (2006.01)
*G06F 15/173* (2006.01)
(52) U.S. Cl. ......................... 370/255; 709/224
(58) Field of Classification Search .................. None
See application file for complete search history.

(56) References Cited

U.S. PATENT DOCUMENTS

| | | | | |
|---|---|---|---|---|
| 5,968,121 A * | 10/1999 | Logan et al. | ............. | 709/219 |
| 6,622,170 B1 * | 9/2003 | Harrison et al. | ............. | 709/219 |
| 7,664,829 B2 * | 2/2010 | Yamamoto et al. | ............. | 709/217 |
| 2004/0003114 A1 * | 1/2004 | Adamczyk | ............. | 709/245 |
| 2004/0117460 A1 * | 6/2004 | Walsh et al. | ............. | 709/219 |
| 2005/0021662 A1 * | 1/2005 | Cline et al. | ............. | 709/217 |
| 2005/0086306 A1 * | 4/2005 | Lemke | ............. | 709/228 |
| 2006/0056306 A1 | 3/2006 | Iwai et al. | | |
| 2006/0092861 A1 * | 5/2006 | Corday et al. | ............. | 370/256 |
| 2006/0092948 A1 * | 5/2006 | Katz et al. | ............. | 370/395.52 |
| 2007/0189249 A1 * | 8/2007 | Gurevich et al. | ............. | 370/338 |
| 2008/0140618 A1 * | 6/2008 | Kumar | ............. | 707/3 |
| 2009/0055518 A1 * | 2/2009 | Auvenshine et al. | ............. | 709/223 |
| 2009/0119662 A1 * | 5/2009 | Fangmeier et al. | ............. | 717/176 |
| 2009/0254392 A1 * | 10/2009 | Zander | ............. | 705/7 |
| 2010/0309784 A1 * | 12/2010 | Mihaly et al. | ............. | 370/230 |

OTHER PUBLICATIONS

"How Domain Controllers are Located in Windows XP" (Online), XP-002556498, Jan. 23, 2007, pp. 1-4.
D. Senie, Amaranth Networks, Inc., "Considerations for the Use of DNS Reverse Mapping", DNS Operation Working Group, XP-015053254, Mar. 12, 2008, pp. 1-7.
International Search Report PCT/US2009/002119 filed Mar. 3, 2009, mailed Dec. 3, 2009.
European Office Communication, Application No. 09 746 900.1, May 24, 2011, a total of 3 pages.

* cited by examiner

*Primary Examiner* — Gregory Sefcheck
*Assistant Examiner* — Joshua Smith
(74) *Attorney, Agent, or Firm* — Squire, Sanders & Dempsey (US) LLP

(57) ABSTRACT

Active directory (AD) Domain Controllers (DC) discovery includes determining the topology of the network, such as the nodes and connections in the network. For example, synthetic data may be transferred within the network and traced to determine the presence and relationships of the various network components. Alternatively, other mapping techniques are based upon mapping a known set of nodes to determine the relationship of the nodes. Next, Lightweight Directory Access Protocol (LDAP) commands are forwarded to the various nodes to identify the AD DC within a range of IP addresses discovered during the mapping of to the topology of the network.

24 Claims, 3 Drawing Sheets

Define Mapping Criteria
210

Search for Nodes

220

Search for nodes in blocks of N IP addresses using user-configured discovery methods
221

Determine Layer 3 connectivity from discovered nodes.
222

If a hop count > 0 was defined, repeat step 221 with newly discovered network ranges until hop count is reached
223

Determine Layer 2 connectivity from any discovered nodes identified as a managed switch or hub.
224

Correlate Layer 2 and Layer 3 address data from steps 221-224 by use of address translation tables (ARP) and Spanning Tree tables collected from discovered SNMP-capable nodes.
225

Determine network connectivity by examining each discovered nodes IP address(es). Layer 2 connectivity is used when available; Layer 3 connectivity is used otherwise.
226

Store Search Results
230

1

DISCOVERY AND VISUALIZATION OF ACTIVE DIRECTORY DOMAIN CONTROLLERS IN TOPOLOGICAL NETWORK MAPS

FIELD OF THE INVENTION

The present invention relates to the use of network topology mapping techniques to discover and integrate within topological network maps to discover Active Directory (AD) Domain Controllers (DC).

BACKGROUND OF THE INVENTION

AD DC, or functionally similar network nodes, performs important administrative functions in the network. For example, AD DC typically manage user and device registration and access.

Over time, as a network grows, expands, and evolves, locations of the AC DC may become lost. Known AD DC mapping tools start with a set of known nodes and looks to characteristics of the nodes to identify the AD DC. However, if nodes are no longer known, these nodes cannot be probed to determine whether they are AD DC. Moreover, each section of the network typically needs to have a local AD DC, and the known application may not properly identify any AD DC for each localized grouping of nodes. Thus, the conventional AD mapping tools visualize the AD infrastructure without a sense of integration into the network infrastructure of the network topology.

Network topology is the study of the arrangement or mapping of the elements (links, nodes, etc.) of a network, especially the physical (real) and logical (virtual) interconnections between nodes. A local area network (LAN) is one example of a network that exhibits both a physical topology and a logical topology. Any given node in the LAN will have one or more links to one or more other nodes in the network and the mapping of these links and nodes onto a graph results in a geometrical shape that determines the physical topology of the network. Likewise, the mapping of the flow of data between the nodes in the network determines the logical topology of the network.

Thus, network topology describes the specific physical or logical arrangement of the elements of a network. The elements may be physical or logical such that physical elements are real, and logical elements may be, for example virtual elements or an arrangement of the elements of a network. Two networks may share a similar topology if the connection configuration is the same, although the networks may differ in other aspects such as physical interconnections, domains, distances between nodes, transmission rates, and/or signal types. A network may incorporate multiple smaller networks. By way of example, a private telephone exchange is a network and that network is part of a local telephone exchange. The local exchange is part of a larger network of telephones which permit international calls, and is networked with cellular telephone networks.

Any particular network topology is determined only by the graphical mapping of the configuration of physical and/or logical connections between nodes. LAN Network Topology is, therefore, technically a part of graph theory. Distances between nodes, physical interconnections, transmission rates, and/or signal types may differ in two networks and yet their topologies may be identical. The arrangement or mapping of the elements of a network gives rise to certain basic topologies which may then be combined to form more complex topologies (hybrid topologies). The most common of these basic types of topologies include bus (such as Linear, Distributed Bus), star, ring, mesh (including a partially connected or a fully connected mesh), tree, hybrid that is composed of one or more network topologies, and point-to-point.

Logical topology corresponds to a mapping of the apparent connections between the nodes of a network, as evidenced by the path that data appears to take when traveling between the nodes. The logical classification of network topologies generally follows the same classifications as those in the physical classifications of network topologies, the path that the data takes between nodes being used to determine the topology as opposed to the actual physical connections being used to determine the topology. Logical topologies are often closely associated with media access control (MAC) methods and protocols. The logical topologies are generally determined by network protocols as opposed to being determined by the physical layout of cables, wires, and network devices or by the flow of the electrical signals, although in many cases the paths that the electrical signals take between nodes may closely match the logical flow of data, hence the convention of using the terms 'logical topology' and 'signal topology' interchangeably. Logical topologies are typically able to be dynamically reconfigured by special types of equipment such as routers and switches.

SUMMARY OF THE INVENTION

Embodiments of the present application related to discovery of active directory (AD) Domain Controllers (DC) through a topography mapping application and method that form a topological network map, uses Lightweight Directory Access Protocol (LDAP) queries and analysis of returned data to identify the AD DC, and then integrated the devices running the LDAP into the topological map.

Certain embodiments of the present application relate to AD DC discovery that includes the determining the topology of the network, such as the nodes and connections in the network. After determining the topology of the network, such as the nodes and connections in the network are determined. Next, LDAP connections are created (bound) to either (a) the current users LDAP endpoint ("server") or (b) if the user has specified one or more domain credentials, to the LDAP endpoint associated with those credentials. LDAP connections can be created using conventional techniques and commands. Next, an LDAP data search is performed using the created connections to return any known Fully Qualified Domain Names (FQDN) of Domain Controllers. A reverse-Domain Name Server (DNS) lookup is then performed for each discovered Domain Controller (DC) in order to establish an IP address for the DC. Any DC which is found to have an IP address within the network address ranges discovered in the network topology may be inserted into the existing list of discovered nodes, each identified as a DC. Finally, the LDAP connections are closed or unbound.

DESCRIPTION OF THE DRAWINGS BRIEF

For proper understanding of the invention, reference should be made to the accompanying drawings, wherein:

FIG. 2 is a flow chart of a network mapping method in accordance with embodiments of the present application.

DETAILED DESCRIPTION OF THE PREFERRED EMBODIMENTS

Figure 1:
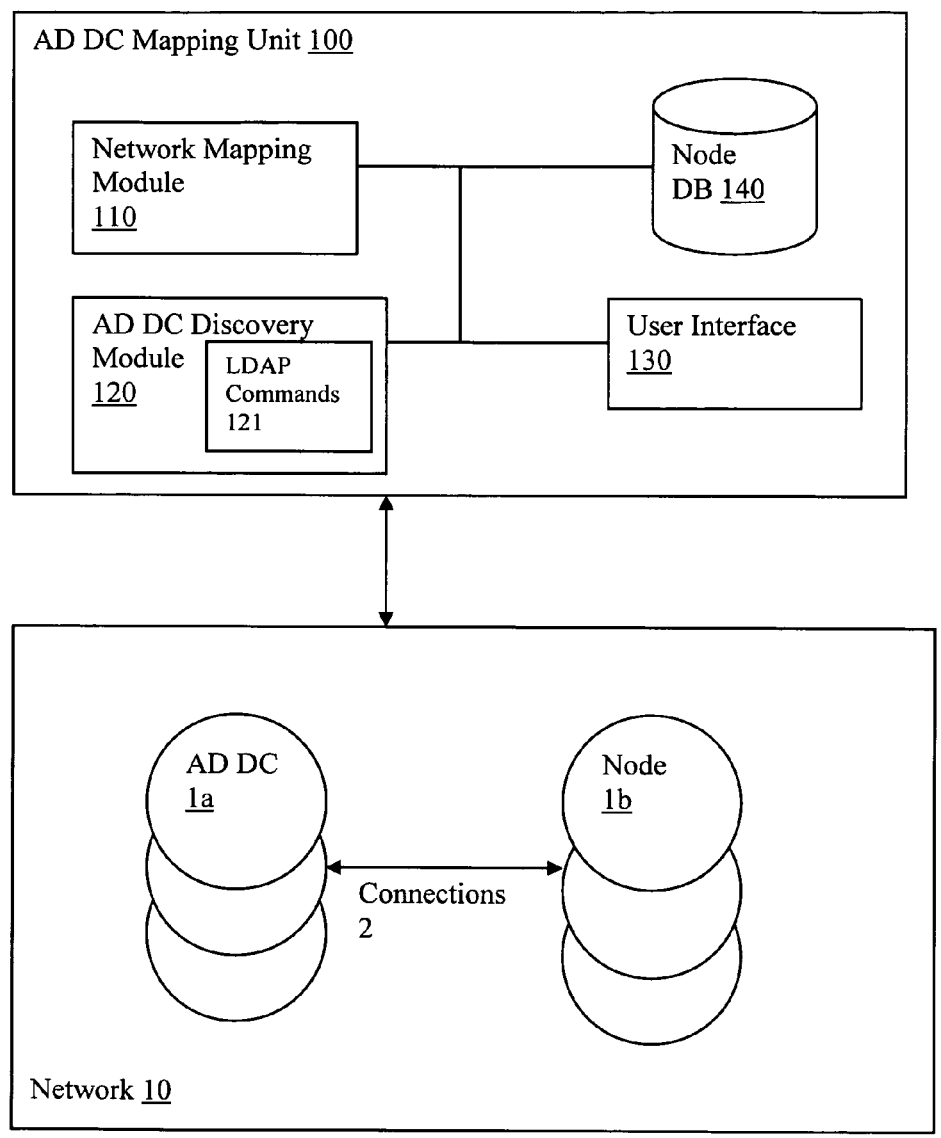
FIG. 1 is a high level schematic diagram of an AD DC mapping system in accordance with embodiments of the present application.

Referring to FIG. 1, embodiments of the present application relate to an AD DC mapping unit 100 configured to connect to network 10 that includes multiple nodes 1a, 1b. In particular, the network 10 includes AD DC 1a and other nodes 1b, as described in greater detail below.

On certain networks, the AD DC 1a are servers that responds to security authentication requests (logging in, checking permissions, etc.) within the server's domain. Typically, one of the DC per domain was configured as the Primary Domain Controller (PDC); all other DC were Backup Domain Controllers (BDC). A BDC could authenticate the users in a domain, but all updates to the domain (new users, changed passwords, group membership, etc) could only be made via the PDC, which would then propagate these changes to all BDC in the domain. If the PDC was unavailable (or unable to communicate with the user requesting the change), the update would fail. If the PDC was permanently unavailable (e.g., if the machine failed), an existing BDC could be promoted to PDC. Because of the critical nature of the PDC, best practices dictated that the PDC should be dedicated solely to domain services, and not used for file/print/application services that could slow down or crash the system.

In newer networks, AD largely eliminated the concept of PDC and BDC in favor of the multi-master replication technology. However, there are still a number of roles that only one Domain Controller can perform, called the Flexible Single Master Operation roles. Some of these roles must be filled by one DC per domain, while others only require one DC per AD forest. If the server performing one of these roles is lost, the domain can still function, and if the server will not be available again an administrator can designate an alternate DC to assume the role, in a process known as seizing the role.

Typically AD is managed using a graphical Management Console. AD is an implementation of Lightweight Directory Access Protocol (LDAP) directory services, described below. A main purpose of the AD is to provide central authentication and authorization services. AD also allows administrators to assign policies, deploy software, and apply critical updates to an organization. AD stores information and settings in a central database. AD networks can vary from a small installation with a few hundred objects, to a large installation with millions of objects.

AD is a directory service used to store information about the network resources across a domain. An AD structure is a hierarchical framework of objects. The objects fall into three broad categories: resources (e.g., printers), services (e.g., e-mail), and users (user accounts and groups). The AD provides information on the objects, organizes the objects, controls access and sets security.

Each object represents a single entity whether a user, a computer, a printer, or a group) and its attributes. Certain objects can also be containers of other objects. An object is uniquely identified by its name and has a set of attributes, the characteristics and information that the object can contain, defined by a schema, which also determines the kind of objects that can be stored in the AD.

Each attribute object can be used in several different schema class objects. These schema objects exist to allow the schema to be extended or modified when necessary. However, because each schema object is integral to the definition of AD objects, deactivating or changing these objects can have serious consequences because it will fundamentally change the structure of AD itself. A schema object, when altered, will automatically propagate through AD, and once the object is created, the object typically can only be deactivated but not deleted. Similarly, changing the schema usually requires a fair amount of planning The framework that holds the objects is viewed at a number of levels. At the top of the structure is the Forest—the collection of every object, its attributes, and rules (attribute syntax) in the AD. The forest holds one or more transitive, trust-linked Trees. A tree holds one or more Domains and domain trees, again linked in a transitive trust hierarchy. Domains are identified by their DNS name structure, the namespace.

The objects held within a domain can be grouped into containers called Organizational Units (OUs). OUs give a domain a hierarchy, ease its administration, and can give a semblance of the structure of an organization in organizational or geographical terms. An OU can contain smaller OUs and can hold multiple nested OUs. Typically, it is recommended to have as few domains as possible in AD and to rely on OUs to produce structure and improve the implementation of policies and administration. The OU is the common level at which to apply group policies, which are AD objects, called Group Policy Objects (GPOs), although policies can also be applied to domains or sites. The OU is the level at which administrative powers are commonly delegated, but granular delegation can be performed on individual objects or attributes as well.

AD also supports the creation of sites, which are physical, rather than logical, groupings defined by one or more IP subnets. Sites distinguish between locations connected by low-speed (e.g., wide are networks (WAN), virtual private networks (VPN)) and high-speed (e.g., local area networks (LAN)) connections. Sites are independent of the domain and OU structure and are common across the entire forest. Sites are used to control network traffic generated by replication and also to refer clients to the nearest Domain Controllers. Exchange 2007 also uses the site topology for mail routing. Policies can also be applied at the site level.

The actual division of the company's information infrastructure into a hierarchy of one or more domains and top-level OUs is often a key decision. Common models are by business unit, by geographical location, by service type, or by object type. These models are also often used in combination. OUs should be structured primarily to facilitate administrative delegation, and secondarily, to facilitate group policy application. Although OUs may form an administrative boundary, the only true security boundary is the forest itself and an administrator of any domain in the forest must be trusted across all domains in the forest.

Physically, the AD information is held on one or more equal peer DC. Typically, each of the DC has a copy of the AD, and changes on one computer are synchronized, or converged, between all the DC computers by multi-master replication. Servers joined with, which are not DC, are called Member Servers.

The AD database is typically split into different stores or partitions. The 'Schema' partition contains the definition of object classes and attributes within the Forest. The 'Configuration' partition, contains information on the physical structure and configuration of the forest (such as the site topology). The 'Domain' partition holds all objects created in that domain. The first two partitions replicate to all DC in the Forest. The Domain partition replicates only to DC within its domain. Subsets of objects in the domain partition are also replicated to DC that are configured as global catalogs.

The AD is generally fully integrated with DNS and TCP/IP. AD replication is a pull rather than a push technology, in which data is distributed by request. The Knowledge Consistency Checker (KCC) creates a replication topology of site links using the defined sites to manage traffic. Intra-site replication is frequent and automatic as a result of change notification, which triggers peers to begin a pull replication cycle. Inter-site replication intervals are less frequent and do not use change notification by default, although this is configurable and can be made identical to intra-site replication. A different computational cost can be given to each link and the site link topology will be altered accordingly by the KCC. Replication between DC may occur transitively through several site links on same-protocol site link bridges, if the 'cost' is low, although KCC automatically costs a direct site-to-site link lower than transitive connections. Site-to-site replication can be configured to occur between a bridgehead server in each site, which then replicates the changes to other DC within the site.

In a multi-domain forest, the AD database becomes partitioned. That is, each domain maintains a list of only those objects that belong in that domain. For example, a user created in Domain A would be listed only in Domain A's DC. Global catalog (GC) servers are used to provide a global listing of all objects in the Forest. The Global catalog is held on DC configured as global catalog servers. Global Catalog servers replicate to themselves all objects from all domains and hence, provide a global listing of objects in the forest. However, in order to minimize replication traffic and to keep the GC's database small, only selected attributes of each object are replicated. This is called the partial attribute set (PAS). The PAS can be modified by modifying the schema and marking attributes for replication to the GC.

Replication of Active Directory uses remote procedure calls. For example, between sites, a user may choose to use SMTP for replication, but only for changes in the Schema or Configuration. SMTP cannot be used for replicating the Domain partition. In other words, if a domain exists on both sides of a WAN connection, RPCs is used for replication.

Active Directory is a necessary component for many services in an organization such as an email exchange. Flexible Single Master Operations (FSMO) roles are also known as operations master roles. Although the AD DC operate in a multi-master model, i.e. updates can occur in multiple places at once, there are several roles that are necessarily single instance:

AD typically supports UNC (\), URL (/), and LDAP URL names for object access. AD internally uses the LDAP version of the X.500 naming structure. Every object has a common name (CN) and a Distinguished name (DN). The DC is domain object class and can have many more than four parts. The object can also have a Canonical name, essentially the DN in reverse, without identifiers, and using slashes. To identify the object within its container the Relative distinguished name (RDN) is used: Each object also has a Globally Unique Identifier (GUID), a unique and unchanging 128-bit string which is used by AD for search and replication. Certain objects also have a User principal name (UPN), an objectname@domain name form.

To allow users in one domain to access resources in another, AD uses trusts. Trusts inside a forest are automatically created when domains are created. The forest sets the default boundaries of trust, not the domain, and implicit, transitive trust is automatic for all domains within a forest. As well as two-way transitive trust, AD trusts can be shortcut (joins two domains in different trees, transitive, one- or two-way), forest (transitive, one- or two-way), realm (transitive or nontransitive, one- or two-way), or external (nontransitive, one- or two-way) in order to connect to other forests or non-AD domains. With one-way trust, when one domain allows access to users on another domain, but the other domain does not allow access to users on the first domain. With two-way trust, two domains allow access to users on the other domain. In this context, a trusting domain is the domain that allows access to users from a trusted domain, a trusted domain is the domain that is trusted; whose users have access to the trusting domain.

Software distribution is run by a separate service that uses additional proprietary schema attributes that work in conjunction with the LDAP protocol. Active Directory does not automate software distribution, but provides a mechanism in which other services can provide software distribution.

The AD DC mapping unit 100 includes a mapping module 110. In particular, the mapping module 110 is configured to map the nodes 1a, 1b in the network 10 and optionally to also map the connections 2 that connect the nodes 1a, 1b. Various network topography mapping techniques are known and may be integrated within the embodiments of the present application, as described in greater detail below.

The mapping module 110 automatically discovers everything on the network, including desktops, servers, printers, hubs, switches and routers using identification and discovery methods (ping/ICMP, SNMP, SIP-based VoIP, NetBIOS and more) to scan IP address ranges and find nodes, as described below in FIG. 2.

Referring now to FIG. 2, a mapping method 200 in accordance with embodiments of the present application is provided. In particular, the mapping method 200 includes the step of defining mapping data criteria in step 210. For example, a user may define a range of IP addresses, the number of hops (or connected devices from each discovered device), and types of devices (e.g., SNMP devices or responder clients) to be discovered during the search.

Continuing with FIG. 2, in step 220, a node search is performed. For example, types of discovery methods such as ICMP Ping, NetBIOS, SIP clients, etc. entail transmission of small UDP or ICMP packets to each IP address in the defined range, as well as discovery of devices within the number hops from the devices discovered. Thus, data is sent and tracked for each defined IP address to determine the device associated with an IP address and the physical and virtual paths used to reach the respective IP address. Optionally, large IP address ranges are subdivided into blocks of 10 addresses, with responses searched from those 10 addresses being. By searching the network in this way, noticeable affects are minimized in network bandwidth or devices.

Continuing with FIG. 2, the node discovery in step 220 is described in greater detail. Search for nodes in blocks of a pre-selected number N of IP addresses using user-configured discovery methods, step 221. Then, the Layer 3 connectivity can be determined from discovered nodes in step 222. If a hop count >0 was defined, repeat step 221 with newly discovered network ranges until hop count is reached, step 223. Then, Layer 2 connectivity is determined from any discovered nodes identified as a managed switch or hub in step 224. The Layer 2 and Layer 3 address data from steps 221-224 are then correlated, for example, by use of address translation tables (ARP) and Spanning Tree tables collected from discovered SNMP-capable nodes in step 225. Then, the network connectivity is determined in step 226 by examining each discovered nodes IP address(es). Layer 2 connectivity is used when available; Layer 3 connectivity is used otherwise.

The network topology search results are stored in step 230. For example, the mapping module 110 may collect and store all topology information in a database 140, providing a source of topology and asset information for enterprise configuration management database (CMDB) strategies. The mapping module 110 also automatically maintains this data to update the network nodes, thereby, providing network engineers with a constantly-accurate representation of the network for visibility and compliance requirements.

Optionally, the network topology search results are stored in step 230. For example, once network nodes are discovered, the mapping module 110 may compile the information into a cohesive, easy-to-view network topology map, for example, with node icons and colored lines representing network connectivity speed on a user interface 130. In this way, the mapping module 110 enables network engineers to see exactly how devices in the network are connected. The mapping module 110 can access managed switches and hubs to accurately diagram port connectivity for all network devices, resulting in a complete map that illustrates all nodes connected directly to a managed switch or hub with the port information displayed adjacent to the node.

Returning back to FIG. 1, in one implementation of the present application, the mapping module 110 performs layer 2 mapping. Layer 2, or the data link layer, provides the functional and procedural means to transfer data between network entities and to detect and possibly correct errors that may occur in the physical layer. Originally, this layer was intended for point-to-point and point-to-multipoint media, characteristic of wide area media in the telephone system. Local area network (LAN) architecture, which included broadcast-capable multi-access media, was developed independently of the ISO work, in IEEE Project 802. LAN services typically arrange bits, from the physical layer, into logical sequences called frames. Logical Link Control Sublayer The uppermost sublayer is Logical Link Control (LLC). This sublayer multiplexes protocols running atop the data link layer, and optionally provides flow control, acknowledgment, and error recovery. The LLC provides addressing and control of the data link. It specifies which mechanisms are to be used for addressing stations over the transmission medium and for controlling the data exchanged between the originator and recipient machines.

The sublayer below the LLC is the Media Access Control (MAC). Sometimes this refers to the sublayer that determines who is allowed to access the media at any one time (usually CSMA/CD), and other times this phrase refers to a frame structure with MAC addresses inside. There are generally two forms of media access control: distributed and centralized. The Media Access Control sublayer also determines where one frame of data ends and the next one starts.

Continuing with FIG. 1, in one implementation of the present application, the mapping module 110 performs layer 3 mapping. Layer 3, or the network layer, is the third layer out of seven in the OSI model and the third layer out of five in the TCP/IP model. In essence, the network layer is responsible for end to end (source to destination) packet delivery, whereas the data link layer is responsible for node to node (hop to hop) frame delivery. The network layer provides the functional and procedural means of transferring variable length data sequences from a source to a destination via one or more networks while maintaining the quality of service, and error control functions. The network layer deals with transmitting information all the way from its source to its destination.

By performing multi-level discovery, the mapping module 110 leverages multiple discovery methods to provide an integrated OSI Layer 2 and Layer 3 topology map to include IP address MAC address Last logged-in user (requires the optional Responder Clients)

DNS name

Node name (determined by SNMP or other client protocol)

Switch port connection

This multi-level discovery of network infrastructure data provides network engineers with easy access to significant time-saving features, including automated representation of topology at levels, to show routers and subnets, additionally managed switches and hubs, or additionally, end nodes that can be filtered by type or group to further refine layouts.

Continuing with FIG. 1, the AD DC mapping unit 100 further includes an AD DC discovery unit 120. In particular, once the mapping module 110 has formed topology map, the AD DC discover unit 120 may use this mapping data to determine the locations of the AC DC 1a within the module network 10.

AD DC discover unit 120 uses Lightweight Directory Access Protocol (LDAP) commands 121 to form queries and analysis of returned data to identify the AD DC, and then integrated the devices running the LDAP into the topological map.

The LDAP is an application protocol for querying and modifying directory services running over TCP/IP. A directory is a set of objects with similar attributes organized in a logical and hierarchical manner. The most common example is the telephone directory, which consists of a series of names (either of persons or organizations) organized alphabetically, with each name having an address and phone number attached. Due to this basic design (among other factors) LDAP is often used by other services for authentication, despite the security problems this causes.

An LDAP directory tree often reflects various political, geographic, and/or organizational boundaries, depending on the model chosen. LDAP deployments today tend to use Domain name system (DNS) names for structuring the topmost levels of the hierarchy. Deeper inside the directory might appear entries representing people, organizational units, printers, documents, groups of people or anything else which represents a given tree entry (or multiple entries).

A current version of LDAPv3 is specified in a series of Internet Engineering Task Force (IETF) Standard Track Requests for comments (RFCs) as detailed in RFC 4510.

A client starts an LDAP session by connecting to an LDAP server, by default on TCP port 389. The client then sends operation requests to the server, and the server sends responses in turn. With some exceptions, the client need not wait for a response before sending the next request, and the server may send the responses in any order. The client may request several various operations.

LDAP is defined in terms of ASN.1, and protocol messages are encoded in the binary format BER, and uses textual representations for a number of ASN.1 fields/types.

The protocol accesses LDAP directories:

A directory is a tree of directory entries.

An entry consists of a set of attributes.

An attribute has a name (an attribute type or attribute description) and one or more values. The attributes are defined in a schema (see below).

Each entry has a unique identifier: its Distinguished Name (DN). This consists of its Relative Distinguished Name (RDN) constructed from some attribute(s) in the entry, followed by the parent entry's DN, where the DN is a full filename and the RDN as a relative filename in a folder.

A DN may change over the lifetime of the entry, for instance, when entries are moved within a tree. To reliably and unambiguously identify entries, a UUID might be provided in the set of the entry's operational attributes.

A server holds a subtree starting from a specific entry, e.g. "dc=example,dc=com" and its children. Servers may also hold references to other servers, so an attempt to access "ou=department,dc=example,dc=com" could return a referral or continuation reference to a server which holds that part of the directory tree. The client can then contact the other server. Some servers also support chaining, which means the server contacts the other server and returns the results to the client.

LDAP rarely defines any ordering: The server may return the values in an attribute, the attributes in an entry, and the entries found by a search operation in any order. This feature follows from the formal definitions, and an entry is defined as a set of attributes, and an attribute is a set of values, and sets need not be ordered.

In LDAP operation, the client gives each request a positive Message ID, and the server response has the same Message ID. The response includes a numeric result code which indicates success, some error condition or some other special cases. Before the response, the server may send other messages with other result data. For example each entry found by the Search operation is returned in such a message.

The LDAP Search operation can be used to both search for and read entries. The server returns the matching entries and maybe continuation references (in any order), followed by the final result with the result code. The Compare operation takes a DN, an attribute name and an attribute value, and checks if the named entry contains that attribute with that value.

The contents of the entries in a subtree are governed by a schema. The schema defines the attribute types that directory entries can contain. An attribute definition includes a syntax, and most non-binary values in LDAPv3 use UTF-8 string syntax. The schema defines object classes. Each entry must have an objectClass attribute, containing named classes defined in the schema. The schema definition of the classes of an entry defines what kind of object the entry may represent—e.g. a person, organization or domain. The object class definitions also list which attributes are obligatory and which are optional. For example, an entry representing a person might belong to the classes "top" and "person." Membership in the "person" class would require the entry to contain the "sn" and "cn" attributes, and allow the entry also to contain "userPassword", "telephoneNumber", and other attributes. Since entries may belong to multiple classes, each entry has a complex of optional and mandatory attribute sets formed from the union of the object classes it represents. ObjectClasses can be inherited, and a single entry can have multiple objectClasses to define the available and required attributes of the entry itself. A parallel to the schema of an objectClass is a class definition and an instance in Object-oriented programming, representing LDAP objectClass and LDAP entry, respectively.

The schema also includes various other information controlling directory entries. Most schema elements have a name and a globally unique Object identifier (OID). Directory servers may publish the directory schema controlling an entry at a base DN given by the entry's subschema/subentry operational attribute (an operational attribute describes operation of the directory rather than user information and is only returned from a search when it is explicitly requested). Server administrators can define their own schemas in addition to the standard ones. A schema for representing individual people within organizations is termed a white pages schema.

Referring back to FIG. 1, In one configuration, a user logs into the AD DC discover unit with administrator access, and then the AD DC discovery module 120 accesses the node database 130 and directs the synthetic LDAP functions to the identified nodes 1a, 1b in the network 10 to determine the AD DC 1a in the network.

Once this information of the location of the AD DC 1a is located by the AD DC discovery module 120, the node database 130 may be updated to reflect this information on the locations of the AD DC 1a, and the display 140 may specially display the AD DC 1a, for example by designating the AD DC 1a with a special symbol, color, or graphic.

Figure 3:
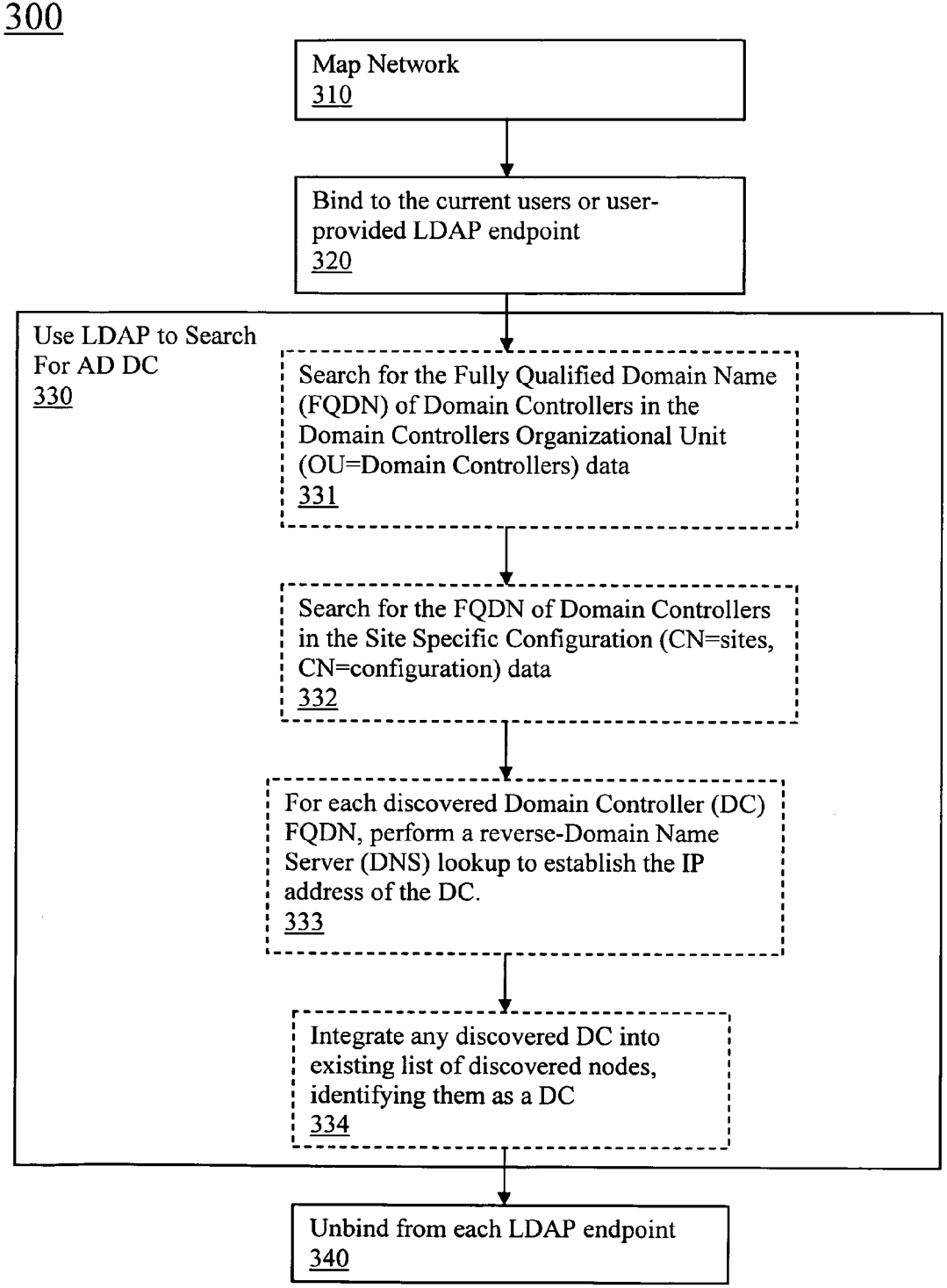
FIG. 3 is a flow chart of an AD DC mapping method in accordance with embodiments of the present application.

Referring now to FIG. 3, embodiments of the present application relate to an AD DC discovery method 300, that includes the steps of determining the topology of the network in step 310, such as the nodes and connections in the network. For example, as described above, in step 310, synthetic data may be transferred within the network and traced to determine the presence and relationships of the various network components. Alternatively, other mapping techniques are based upon mapping a known set of nodes to determine the relationship of the nodes.

Next, LDAP connections are created (bound) in step 320 to either (a) the current user's LDAP endpoint (or a "server"). Alternatively, if the user has specified one or more domain credentials, a binding is created to the LDAP endpoint associated with those credentials. LDAP connections can be created using conventional techniques and commands.

Next, LPAD commands are used to locate the AD DC in step 330. For example, an LDAP data search may be performed using the created connections to return any known Fully Qualified Domain Names (FQDN) of DC in steps 331 and 332. In particular, in step 331, a search of the FQDN of DC in the organization unit is performed. Similarly, in step 332, a search of the FQDN of DC in the cited specific configuration is performed. In this way, an AD DC located outside of the LDAP endpoint identified in step 320 can be performed using the mapping data from step 310. In the search of the FQDN in steps 331 and 332, the command ldapsearch API (ldap_search_s( )) may be used, and then any responses(s) may be iterated to be re-evaluated. These response(s) contain the FQDN of one or more DC.

Then, in step 333, a reverse-Domain Name Server (DNS) lookup is performed for each Domain Controller (DC) discovered in steps 331 and 332 in order to establish an IP address for the DC. In step 334, any DC which is found to have an IP address within the network address ranges discovered in step 310 is inserted into the existing list of discovered nodes, each identified as a DC. In step 340, each LDAP connection created in step 320 are closed or unbound to return the node to the original state.

As discussed above, various embodiments of the invention can be configured in numerous physical elements, or can be configured at a single network element or configured in a number of elements having various disclosed functions distributed throughout. The control of the IP SLA or other monitoring configurations and other functions can be performed at various network components, such as at user equipment, at VOIP server, at an access gateway or at another network component associated with the VOIP network and access to the network.

A person of ordinary skill in the art would understand that the above-discussed embodiments of the invention are for illustrative purposes only, and that the invention can be embodied in numerous configurations as discussed above. Additionally, the invention can be implemented as a computer program on a computer readable medium, where the computer program controls a computer or a processor to perform the various functions which are discussed as method steps and also discussed as hardware or hardware/software elements.

The invention claimed is:

1. A method for discovering an active directory (AD) domain controllers (DC) comprising:
   mapping a topology of a network;
   creating a lightweight directory access protocol (LDAP) connection by binding to a LDAP endpoint;
   using LDAP commands to perform a LDAP data search for the AD DC using the created LDAP connection, and returning at least one fully qualified domain name (FQDN) of a discovered AD DC; and
   unbinding from the LDAP endpoint,
   wherein the mapping the topology of the network comprises searching for nodes in a pre-defined number of internet protocol (ip) addresses and repeating the search for a predefined number of hops.

2. The method of claim 1, wherein the mapping a topology of a network comprises:
   transferring synthetic data within the network; and tracing the synthetic data.

3. The method of claim 1, wherein the mapping the topology of the network further comprises:
   determining layer 2 and layer 3 connectivity from any discovered nodes;
   correlating the layer 2 and layer 3 address data; and
   determining network connectivity of discovered ip addresses.

4. The method of claim 1, wherein the mapping of the topology of the network comprises receiving and storing user preferences comprising the size of the block of ip addresses and the number of hops.

5. The method of claim 1, wherein the binding of the LDAP endpoint comprises creating a LDAP connection to a current LDAP endpoint.

6. The method of claim 1, wherein the binding of the LDAP endpoint comprises creating a LDAP binding to a node associated with user-specified domain credentials.

7. The method of claim 1, wherein the using of the LDAP commands to perform a search for the AD DC comprises:
   performing a reverse-domain name server (DNS) lookup for each discovered AD DC to establish an ip address for the AD DC;
   inserting, into a list, a discovered AD DC that has an ip address within network address ranges discovered in the mapping.

8. The method of claim 1, wherein the returning of at least one FQDN comprises:
   searching the FQDN of domain controllers in an organization unit; and
   searching the FQDN of domain controllers in a cited specific configuration.

9. An apparatus for discovering an active directory (AD) domain controllers (DC), the apparatus comprising:
   a server comprising a processor and memory,
   the server configured to
      map a topology of a network;
      create a lightweight directory access protocol (LDAP) connection by binding to a LDAP endpoint;
      use LDAP commands to perform a LDAP data search for the AD DC using the created LDAP connection, and to return at least one fully qualified domain name (FQDN) of a discovered AD DC; and
      unbind from the LDAP endpoint,
   wherein, when mapping the topology of the network, the server is further configured to search for nodes in a pre-defined number of ip addresses and repeat the search for a predefined number of hops.

10. The apparatus of claim 9, wherein, when mapping the topology of the network, the server is configured to transfer synthetic data within the network, and trace the synthetic data.

11. The apparatus of claim 9, wherein, when mapping the topology of the network, the server is further configured to:
    determine layer 2 and layer 3 connectivity from any discovered nodes;
    correlate the layer 2 and layer 3 address data; and
    determine network connectivity of discovered IP addresses.

12. The apparatus of claim 9, wherein, when mapping the topology of the network, the server is further configured to:
    receive and store user preferences comprising the size of the block of ip addresses and the number of hops.

13. The apparatus of claim 9, wherein, when binding the LDAP endpoint, the server is further configured to create a LDAP connection to a current LDAP endpoint.

14. The apparatus of claim 9, wherein, when binding the LDAP endpoint, the server is further configured to create a LDAP binding to a node associated with user-specified domain credentials.

15. The apparatus of claim 9, wherein, when using the LDAP commands to perform a search for the AD DC, the server is further configured to:
    perform a reverse-domain name server (DNS) lookup for each discovered AD DC to establish an ip address for the AD DC;
    insert, into a list, a discovered AD DC that has an ip address within network address ranges discovered in the mapping.

16. The apparatus of claim 15, wherein, when returning at least one FQDN, the server is further configured to:
    search the FQDN of domain controllers in an organization unit; and
    search the FQDN of domain controllers in a cited specific configuration.

17. A computer program for discovering an active directory (AD) domain controllers (DC), embodied on a non-transitory computer-readable medium, the computer program configured to control a processor to perform operations, comprising:
    mapping a topology of a network;
    creating a lightweight directory access protocol (LDAP) connection by binding to a LDAP endpoint;
    using LDAP commands to perform a LDAP data search for the AD DC using the created LDAP connection, and returning at least one fully qualified domain name (FQDN) of a discovered AD DC; and
    unbinding from the LDAP endpoint,
    wherein the mapping the topology of the network comprises searching for nodes in a pre-defined number of ip addresses and repeating the search for a predefined number of hops.

18. The computer program of claim 17, wherein the mapping a topology of a network comprises: transferring synthetic data within the network; and tracing the synthetic data.

19. The computer program of claim 17, wherein the mapping the topology of the network further comprises:
    determining layer 2 and layer 3 connectivity from any discovered nodes;
    correlating the layer 2 and layer 3 address data; and
    determining network connectivity of discovered ip addresses.

20. The computer program of claim 17, wherein the mapping of the topology of the network comprises receiving and storing user preferences comprising the size of the block of ip addresses and the number of hops.

21. The computer program of claim 17, wherein the binding of the LDAP endpoint comprises creating a LDAP connection to a current LDAP endpoint.

22. The computer program of claim 17, wherein the binding of the LDAP endpoint comprises creating a LDAP binding to a node associated with user-specified domain credentials.

23. The computer program of claim 17, wherein the using of the LDAP commands to search for the AD DC comprising:
   performing a reverse-domain name server (DNS) lookup for each discovered AD DC to establish an ip address for the AD DC;
   inserting, into a list, a discovered ad dc that has an ip address within a network address ranges discovered in the mapping.

24. The computer program of claim 23, wherein the returning of at least one FQDN comprises:
   searching the FQDN of domain controllers in an organization unit; and
   searching the FQDN of domain controllers in a cited specific configuration.

* * * * *